United States Patent
Cheng et al.

(10) Patent No.: US 10,425,251 B2
(45) Date of Patent: Sep. 24, 2019

(54) METHOD AND SYSTEM OF DEVICE-TO-DEVICE TUNNEL ESTABLISHMENT BETWEEN SMALL CELLS

(71) Applicants: WISTRON NEWEB CORPORATION, Hsinchu (TW); INDUSTRIAL TECHNOLOGY RESEARCH INSTITUTE, Hsinchu (TW)

(72) Inventors: Chui-Chu Cheng, Hsinchu (TW); Chieh-Wen Cheng, Hsinchu (TW); Jen-Shun Yang, Hsinchu (TW); Kuei-Li Huang, Hsinchu (TW); Yi-Huai Hsu, Hsinchu (TW)

(73) Assignees: WISTRON NEWEB CORPORATION, Hsinchu (TW); INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 377 days.

(21) Appl. No.: 15/297,228

(22) Filed: Oct. 19, 2016

(65) Prior Publication Data
US 2017/0111946 A1   Apr. 20, 2017

Related U.S. Application Data
(60) Provisional application No. 62/244,177, filed on Oct. 20, 2015.

(51) Int. Cl.
*H04L 12/46* (2006.01)
*H04W 76/14* (2018.01)
(Continued)

(52) U.S. Cl.
CPC ........ *H04L 12/4633* (2013.01); *H04W 76/14* (2018.02); *H04W 8/005* (2013.01);
(Continued)

(58) Field of Classification Search
CPC   H04L 12/4633; H04W 76/14; H04W 84/045; H04W 8/005; H04W 24/06; H04W 92/20
See application file for complete search history.

(56) References Cited

U.S. PATENT DOCUMENTS

| 6,580,704 | B1 * | 6/2003 | Wellig | H04L 29/12009 370/338 |
| 2016/0302062 | A1 * | 10/2016 | Lehtovirta | H04W 76/10 |
| 2018/0184470 | A1 * | 6/2018 | Luo | H04W 36/30 |

OTHER PUBLICATIONS

3rd Generation Partnership Project, 3GPP TS 23.303 V13.3.0 (Mar. 2016); Technical Specification.

* cited by examiner

*Primary Examiner* — Mandish K Randhawa
(74) *Attorney, Agent, or Firm* — Li & Cai Intellectual Property (USA) Office

(57) ABSTRACT

Disclosed are a method and a system of device-to-device tunnel establishment between small cells, applied to a wireless backhaul management device, a first small cell and a second small cell. The method comprises: matching the first small cell and the second small cell according to a first discovery response and a second discovery response; submitting a match report; replying with a match report response; conducting a D2D connection authentication procedure between the second small cell and the first small cell; wirelessly connecting the second small cell and the first small cell, conducting a connection test and submitting a connection test report; replying with a D2D tunnel estab-
(Continued)

lishment decision according to the connection test report; and establishing a D2D tunnel between the second small cell and the first small cell.

22 Claims, 8 Drawing Sheets

(51) Int. Cl.
*H04W 84/04* (2009.01)
*H04W 92/20* (2009.01)
*H04W 8/00* (2009.01)
*H04W 24/06* (2009.01)

(52) U.S. Cl.
CPC .......... *H04W 24/06* (2013.01); *H04W 84/045* (2013.01); *H04W 92/20* (2013.01)

METHOD AND SYSTEM OF DEVICE-TO-DEVICE TUNNEL ESTABLISHMENT BETWEEN SMALL CELLS

CROSS-REFERENCE TO RELATED APPLICATION

The present application claims priority benefits under 35 U.S. C. § 119(e) from U.S. Provisional Application No. 62/244,177, filed on Oct. 20, 2015. The present application incorporates the foregoing disclosures herein by reference.

BACKGROUND OF THE INVENTION

1. Field of the Invention

The instant disclosure relates to a method and a system of device-to-device (D2D) tunnel establishment; in particular, to a method and a system of D2D tunnel establishment between small cells.

2. Description of Related Art

It takes lots of time and labor to build a wire backhaul network of small cells for cell phone traffic in a city, not even to mention building a wireless backhaul network of small cells. In addition to the labor cost and the time consumption, the geographic factors and the environmental factors may also be problems. Thus, how to build a backhaul network of small cells in a city is worth investigating.

SUMMARY OF THE INVENTION

The instant disclosure provides a method and a system of device-to-device (D2D) tunnel establishment between small cells, to establish D2D tunnels among small cells. A small cell is also provided by the instant disclosure. The small cell provides a relay layer, such that after a user message and a S1/X2 control message are transmitted and received through the D2D tunnels among small cells, the small cell can determine to wirelessly transmit the received user message and the S1/X2 control message to another small cell or can determine to wiredly transmit the received user message and the S1/X2 control message to the core network. In addition, the small cell can determine to package or unpackage the D2D packet that is transmitted and received among the small cells. In this manner, the small cells can transmit messages through the D2D tunnels.

The above method provided by the instant disclosure is applied to a wireless backhaul management device, a first small cell and a second small cell. The wireless backhaul management device is wirelessly connected to the first small cell and the second small cell, and the first small cell is connected to a core network. This method comprises: matching the first small cell and the second small cell according to a first discovery response and a second discovery response; submitting a match report from the second small cell to the wireless backhaul management device; replying with a match report response from the wireless backhaul management device to the second small cell; conducting a D2D connection authentication procedure between the second small cell and the first small cell; wirelessly connecting the second small cell and the first small cell, and conducting a connection test and submitting a connection test report to the wireless backhaul management device; replying with a D2D tunnel establishment decision according to the connection test report from the wireless backhaul management device to the second small cell; and establishing a first tunnel between the second small cell and the first small cell.

The above system provided by the instant disclosure comprises a wireless backhaul management device, a first small cell and a second small cell. The wireless backhaul management device is wirelessly connected to the first small cell and the second small cell, the first small cell is connected to a core network. This system executes a method of D2D tunnel establishment between small cells. The method executed by this system comprises: matching the first small cell and the second small cell according to a first discovery response and a second discovery response; submitting a match report from the second small cell to the wireless backhaul management device; replying with a match report response from the wireless backhaul management device to the second small cell; conducting a D2D connection authentication procedure between the second small cell and the first small cell; wirelessly connecting the second small cell and the first small cell, conducting a connection test and submitting a connection test report to the wireless backhaul management device; replying with a D2D tunnel establishment decision according to the connection test report from the wireless backhaul management device to the second small cell; and establishing a first tunnel between the second small cell and the first small cell.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, but these elements should not be limited by these terms. These terms are only to distinguish one element, region or section from another. For example, a first element, region or section could be termed a second element, region or section and, similarly, a second element, region or section could be termed a first element, region or section without departing from the teachings of the instant disclosure. As used herein, the term "and/or" includes any and all combinations of one or more of the associated listed items.

Figure 1:
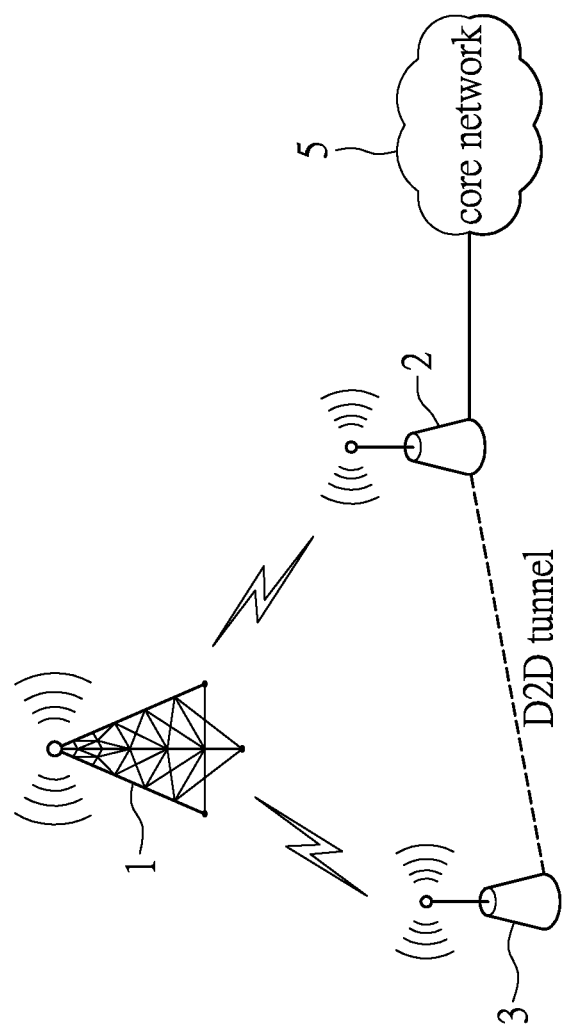
FIG. 1 shows a schematic diagram of a system of D2D tunnel establishment between small cells of one embodiment of the instant disclosure.

Referring to FIG. 1, FIG. 1 shows a schematic diagram of a system of D2D tunnel establishment between small cells of one embodiment of the instant disclosure. As shown in FIG. 1, the system of device-to-device (D2D) tunnel establishment between small cells comprises a wireless backhaul management device 1, a first small cell 2 and a second small cell 3. The wireless backhaul management device 1 executes a wireless backhaul management program to be wirelessly connected to the first small cell 2 and the second small cell 3. The first small cell 2 is connected to a core network 5. This system executes a method of D2D tunnel establishment between small cells to establish a D2D tunnel between the first small cell 2 and the second small cell 3. The wireless backhaul management device 1, the first small cell 2 and the second small cell 3 comprise proper elements, logics and circuits. The wireless backhaul management device 1 can be a server that can executes the wireless backhaul management program in the Wireless Access Network. The wireless backhaul management program is a management program to manage the network topology between small cells. The first small cell 2 can be wiredly connected to the core network 5 through an S1 protocol interface, or has been established a wireless D2D tunnel with another small cell and then is connected to the core network 5 through that small cell.

Figure 2:
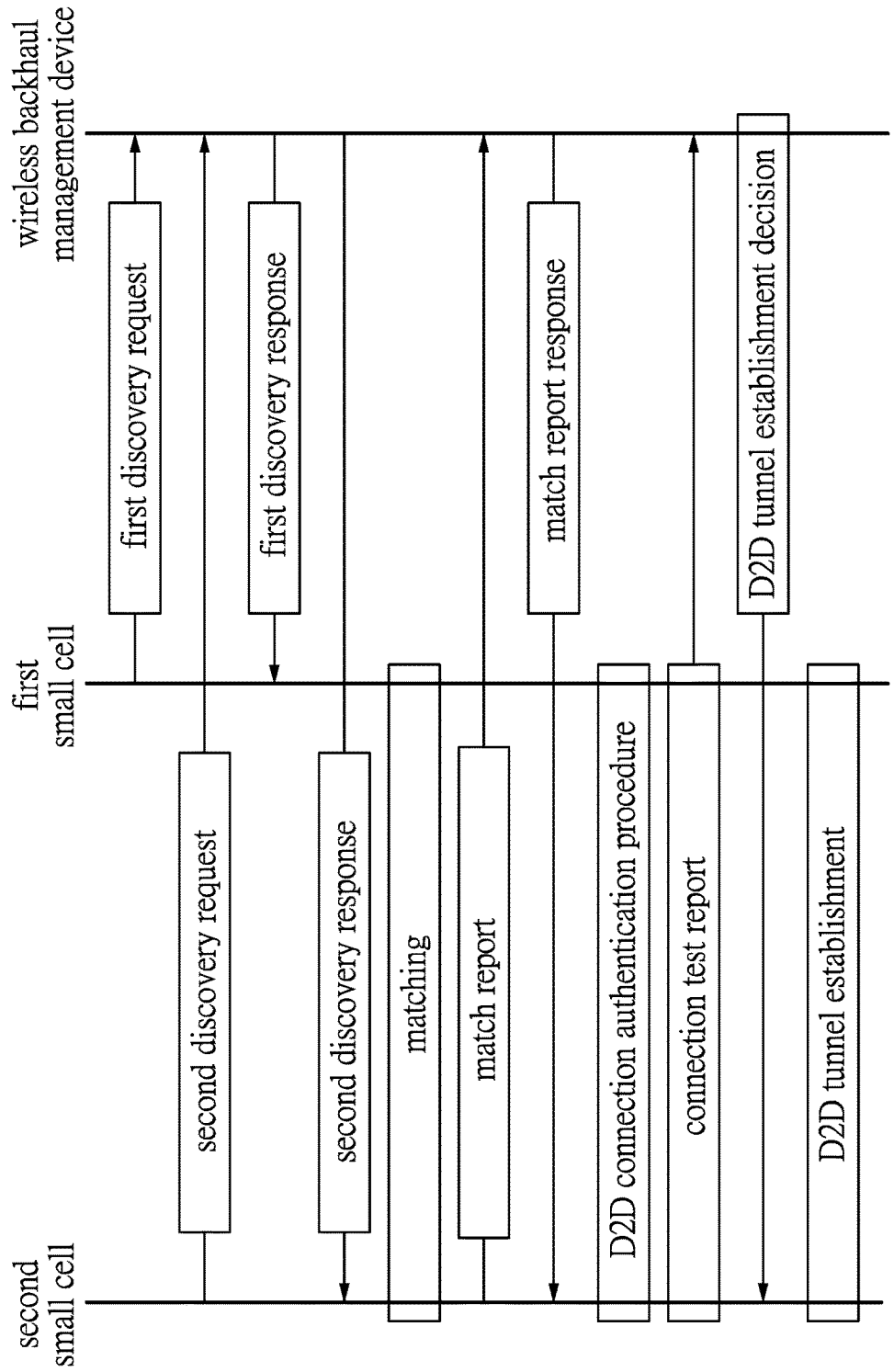
FIG. 2 shows a flow chart of a method of D2D tunnel establishment between small cells of one embodiment of the instant disclosure.

Referring to FIG. 2, FIG. 2 shows a flow chart of a method of D2D tunnel establishment between small cells of one embodiment of the instant disclosure. As shown in FIG. 2, the method of device-to-device D2D tunnel establishment between small cells comprises steps: a) the first small cell 2 submits a first discovery request to the wireless backhaul management device 1, and the wireless backhaul management device 1 replies with the first discovery response to the first small cell 2; b) the second small cell 3 submits a second discovery request to the wireless backhaul management device 1, and the wireless backhaul management device 1 replies with the second discovery response to the second small cell 3; c) the first small cell and the second small cell match with each other according to the first discovery response and the second discovery response, and then the first small cell successfully matches the second small cell; d) the second small cell 3 submits a match report to the wireless backhaul management device 1; e) the wireless backhaul management device 1 replies with a match report response to the second small cell 3; f) a D2D connection authentication procedure is established between the second small cell 3 and the first small cell 2; g) the second small cell 3 and the first small cell 2 are wirelessly connected, a connection test is conducted and a connection test report is submitted to the wireless backhaul management device 1; h) the wireless backhaul management device 1 replies with a D2D tunnel establishment decision according to the connection test report to the second small cell 3; and i) a first tunnel (that is, a D2D tunnel) is established between the second small cell 3 and the first small cell 2.

In step a), the first small cell 2 submits a first discovery request to the wireless backhaul management device, and the wireless backhaul management device 1 replies with a first discovery response to the first small cell 2. When the first small cell 2 has finished a Self Organizing Network procedure and is preparing for providing services, the first small cell 2 needs to submit a request and obtain a permission to provide small cell services. The first discovery request submitted by the first small cell 2 comprises a first identification code of the first small cell 2, a first D2D identification code, a wireless backhaul identification code and a route information. The first discovery response replied from the wireless backhaul management device 1 comprises a first application code. When the first small cell 2 receives the first discovery response replied by the wireless backhaul management device 1, the first small cell 2 starts to provide services and to broadcast the first application code, or waits to be discovered. The first identification code is the unique identification code of the first small cell 2. The first D2D identification code is an interface identification code of the D2D packet transmission of the first small cell 2. The wireless backhaul identification code refers to the backbone network that the first small cell is configured in. The route information comprises a tunnel depth, and the tunnel depth refers to the number of hops (small cells) between the core network and the first small cell 2. The first application code is a service identification code provided by the first small cell 2.

In step b), the second small cell 3 submits a second discovery request to the wireless backhaul management device 1, and the wireless backhaul management device 1 replies with a second discovery response to the second small cell 3. When the second small cell 3 needs to be served, the second small cell 3 needs to submit a request and obtain a permission to be served. The second small cell 3 submits a second discovery request to the wireless backhaul management device 1, and then the second small cell 3 determines whether to be served according to a second discovery response obtained from the wireless backhaul management device 1. The second discovery request submitted by the second small cell 3 comprises a second identification code of the second small cell 3 and a second D2D identification code. The second discovery response obtained from the wireless backhaul management device 1 comprises a second application code. When the second small cell 3 receives the second discovery response from the wireless backhaul management device 1, the second small cell 3 starts to monitor the response code, or searches for the response code. The second identification code is the unique identification code of the second small cell 3. The second D2D identification code is an interface identification code of the D2D packet transmission of the second small cell 3. The second application code is a service identification code of the second small cell 3 for being served.

The sequence of step a) and step b) is not restricted herein. In another embodiment, step b) can be executed prior to step a), or step a) and step b) can be executed simultaneously. When the D2D identification code of the first small cell 2 and the D2D identification code of the second small cell 3 are the same, the first small cell 2 and the second small cell 3 can transmit D2D packets with each other. That is, the first small cell 2 and the second small cell 3 can communicate with each other or transmit signal to each other. When the first application code and the second application code are the same, the service provided by the first small cell 2 is the service that the second small cell 3 needs.

In step c), in one situation, during the process in which the first small cell 2 and the second small cell 3 successfully match with each other according to the first discovery response and the second discovery response, the second small cell 3 monitors the first application code in the first discovery response broadcasted by the first small cell 2. When the first application code in the first discovery response is monitored by the second small cell 3, the second small cell 3 compares the first application code with the second application code in the second discovery response. When the first application code and the second application code are the same, the service provided by the first small cell 2 is the service that the second small cell 3 needs. In other words, the second small cell 3 successfully matches with the first small cell 2. In another situation, during the process in which the first small cell 2 and the second small cell 3 successfully match with each other according to the first discovery response and the second discovery response, the first small cell 2 waits to be discovered to provide services, and the second small cell 3 broadcasts the second application code in the second discovery response to search for a service. When the second application code in the second discovery response is discovered by the first small cell 2, the first small cell 2 compares the first application code with the second application code in the second discovery response. When first application code and the second application code are the same, the first small cell 2 replies with a response code to the second small cell 3 (herein, the response code can be the first application code or another code that can show that the service provided by the first small cell 2 and the service needed by the second small cell 3 are the same), and the service provided by the first small cell 2 is the service that the second small cell 3 needs. Namely, the second small cell 3 successfully matches with the first small cell 2.

In step d), during the process in which the second small cell 3 submits a match report to the wireless backhaul management device 1, the second small cell 3 sends a match report to the wireless backhaul management device 1, wherein this match report shows that the second small cell 3 successfully matches with the first small cell 2.

In step e), during the process in which the wireless backhaul management device 1 replies with a match report response to the second small cell 3, after the wireless backhaul management device 1 receives the match report sent by the second small cell 3, the wireless backhaul management device 1 transmits a match report response to the second small cell 3 and this match report response comprises a wireless backhaul identification code of the first small cell 2 and a route information.

Figure 3:
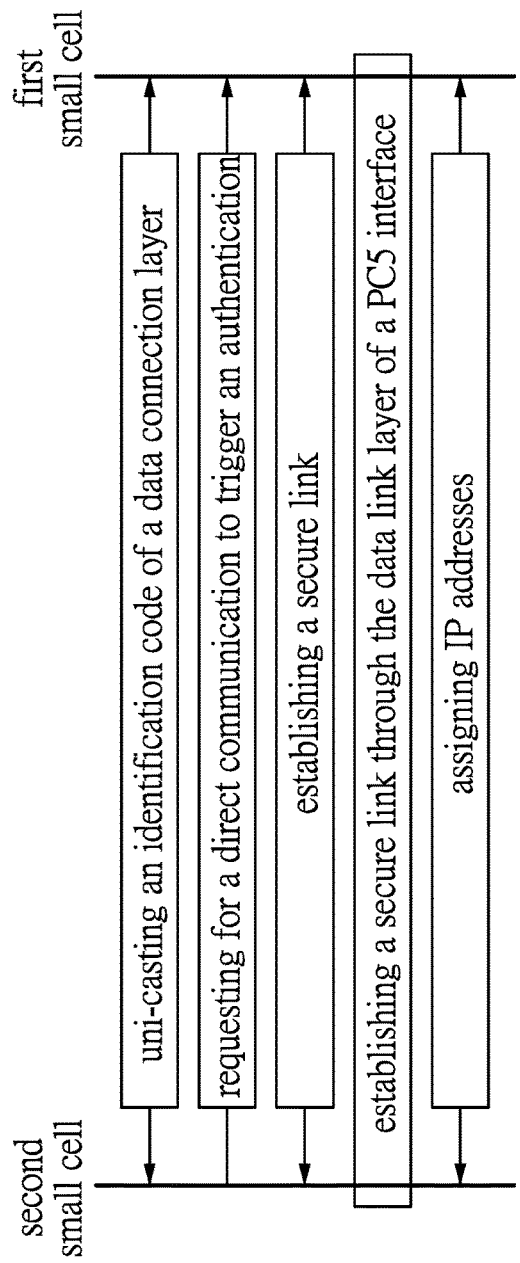
FIG. 3 shows a flow chart of a D2D connection authentication procedure of D2D tunnel establishment between small cells in one embodiment of the instant disclosure.

In step f), during the process in which a D2D connection authentication procedure between the second small cell 3 and the first small cell 2 is established, there are steps included as follows. Referring to FIG. 3, FIG. 3 shows a flow chart of a D2D connection authentication procedure of D2D tunnel establishment between small cells in one embodiment of the instant disclosure. As shown in FIG. 3, the D2D connection authentication procedure comprises: step f-1) uni-casting an identification code of a data connection layer; step f-2) requesting for a direct communication to trigger an authentication; step f-3) establishing a secure link; step f-4) establishing a secure link through the data link layer of a PC5 interface; and step f-5) assigning IP addresses. In step f-1), the first small cell 2 and the second small cell 3 transmit an identification code of their data link layer with each other by using the unicast communication. In step f-2), the second small cell 3 sends a request for a direct communication to the first small cell 2 to trigger a mutual authentication. In step f-3), after the mutual authentication between the first small cell 2 and the second small cell 3 is finished, a secure link has been established. In step f-4), a secure link through the data link layer of a PC5 interface is established between the first small cell 2 and the second small cell 3. In step f-5), IP addresses are assigned between the first small cell 2 and the second small cell 3.

In step g), during the process in which the second small cell 3 and the first small cell 2 are wirelessly connected, a connection test is conducted and a connection test report is submitted to the wireless backhaul management device 1, a wireless connection test is executed for the connection between the first small cell 2 and the second small cell 3. After conducting a connection test, the first small cell 2 independently submits a connection test report to the wireless backhaul management device 1 and the second small cell 3 independently submits a connection test report to the wireless backhaul management device 1, or the first small cell 2 and the second small cell 3 simultaneously submit their connection test reports to the wireless backhaul management device 1. The connection test report comprises a tunnel quality, a path transmission rate, the tunnel depth and a tunnel number. The path transmission rate refers to the transmission rate of the wirelessly connected second small cell and the first small cell and the transmission rate of the connected first small cell and the core network. The tunnel number refers to the number of the D2D tunnels established by the second small cell 3.

Figure 4:
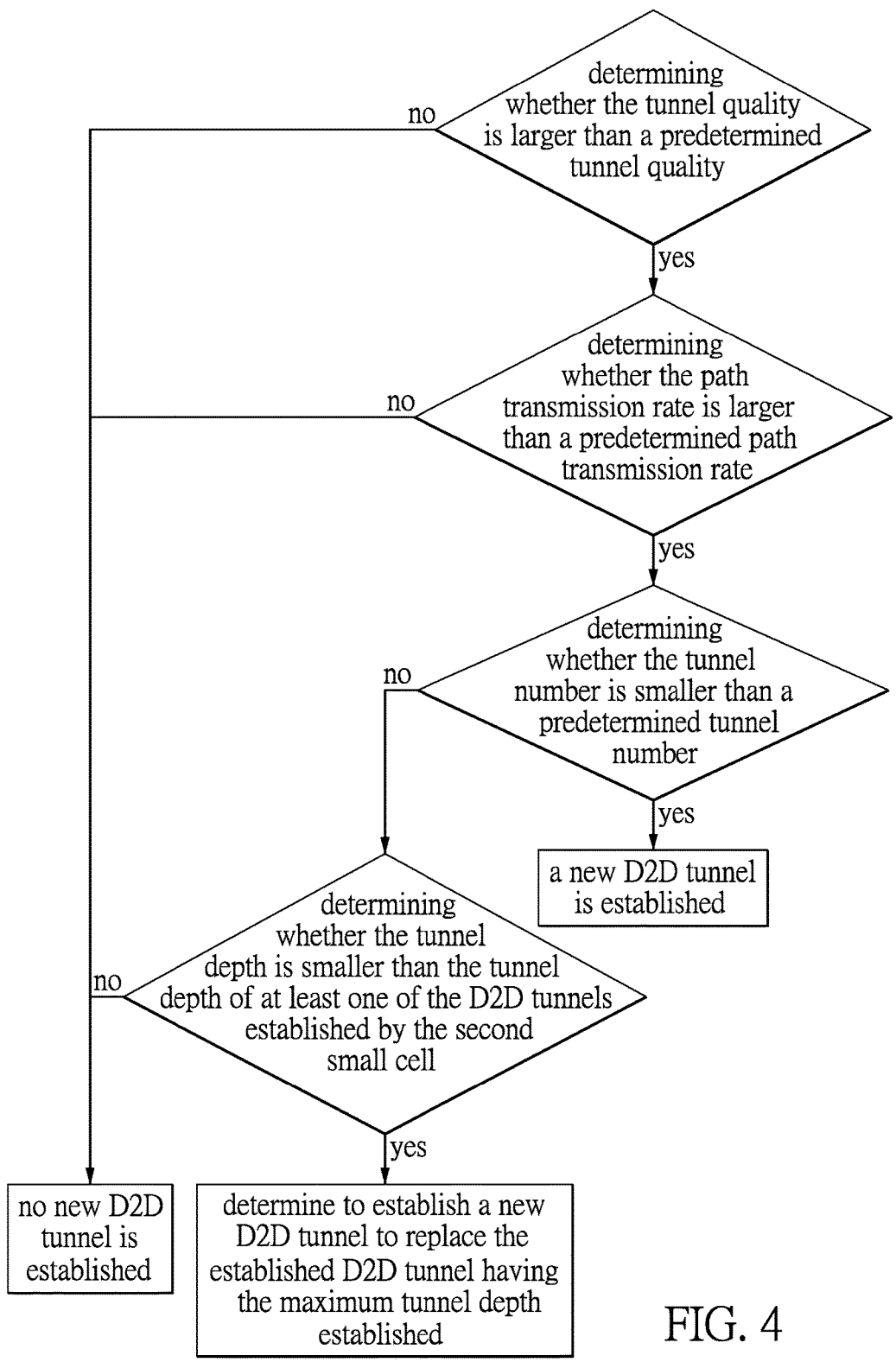
FIG. 4 shows a flow chart to determine whether a D2D tunnel is established between small cells in one embodiment of the instant disclosure.

In step h), during the process in which the wireless backhaul management device 1 replies with a D2D tunnel establishment decision to the second small cell 3 according to the connection test report, after the wireless backhaul management device 1 receives the connection test report, the wireless backhaul management device 1 determines whether to establish a D2D tunnel and transmits the D2D tunnel establishment decision to the second small cell 3. Referring to FIG. 4, FIG. 4 shows a flow chart to determine whether a D2D tunnel is established between small cells in one embodiment of the instant disclosure. The flow chart in FIG. 4 corresponds to the step relevant to the D2D tunnel establishment decision in FIG. 2. As shown in FIG. 4, in the step to determine whether a D2D tunnel is established between small cells, there are steps included as follows. Step h-1) is to determine whether the tunnel quality is larger than a predetermined tunnel quality. If no, no new D2D tunnel is established. If yes, it goes to step h-2). Step h-2) is to determine whether the path transmission rate is larger than a predetermined path transmission rate. Precisely, step h-2) is to determine whether the transmission rate of the wirelessly connected second small cell and the first small cell and the transmission rate of the connected first small cell and the core network are larger than the predetermined path transmission rate. If no, no new D2D tunnel is established. If yes, it goes to step h-3). Step h-3) is to determine whether the tunnel number is smaller than a predetermined tunnel number. Specifically speaking, step h-3) is to determine whether the number of D2D tunnels established by the second small cell is smaller than the predetermined tunnel number. If yes, it goes to step h-4). Step h-4) is to determine that a first tunnel, which is a new D2D tunnel, is established. In addition, in step h-3), if no, it goes to step h-5). Step h-5) is to determine whether the tunnel depth is smaller than the tunnel depth of at least one of the D2D tunnels which are already established by the second small cell 3. If no, no new D2D tunnel is established. If yes, it goes to step h-6). Step h-6) is to determine to establish a new D2D tunnel to replace the D2D tunnel having the maximum tunnel depth established by the second small cell 3. Those skilled in the art should easily understand that, the predetermined tunnel quality, the predetermined path transmission rate and the predetermined tunnel number can be adjusted according to the connection test reports or the actual condition of the D2D tunnels.

In step i), during the process in which a first tunnel is established between the second small cell 3 and the first small cell 2, after the second small cell 3 receives a D2D tunnel establishment decision transmitted by the wireless backhaul management device 1, a new D2D tunnel between the second small cell 3 and the first small cell 2 is established.

Figure 5:
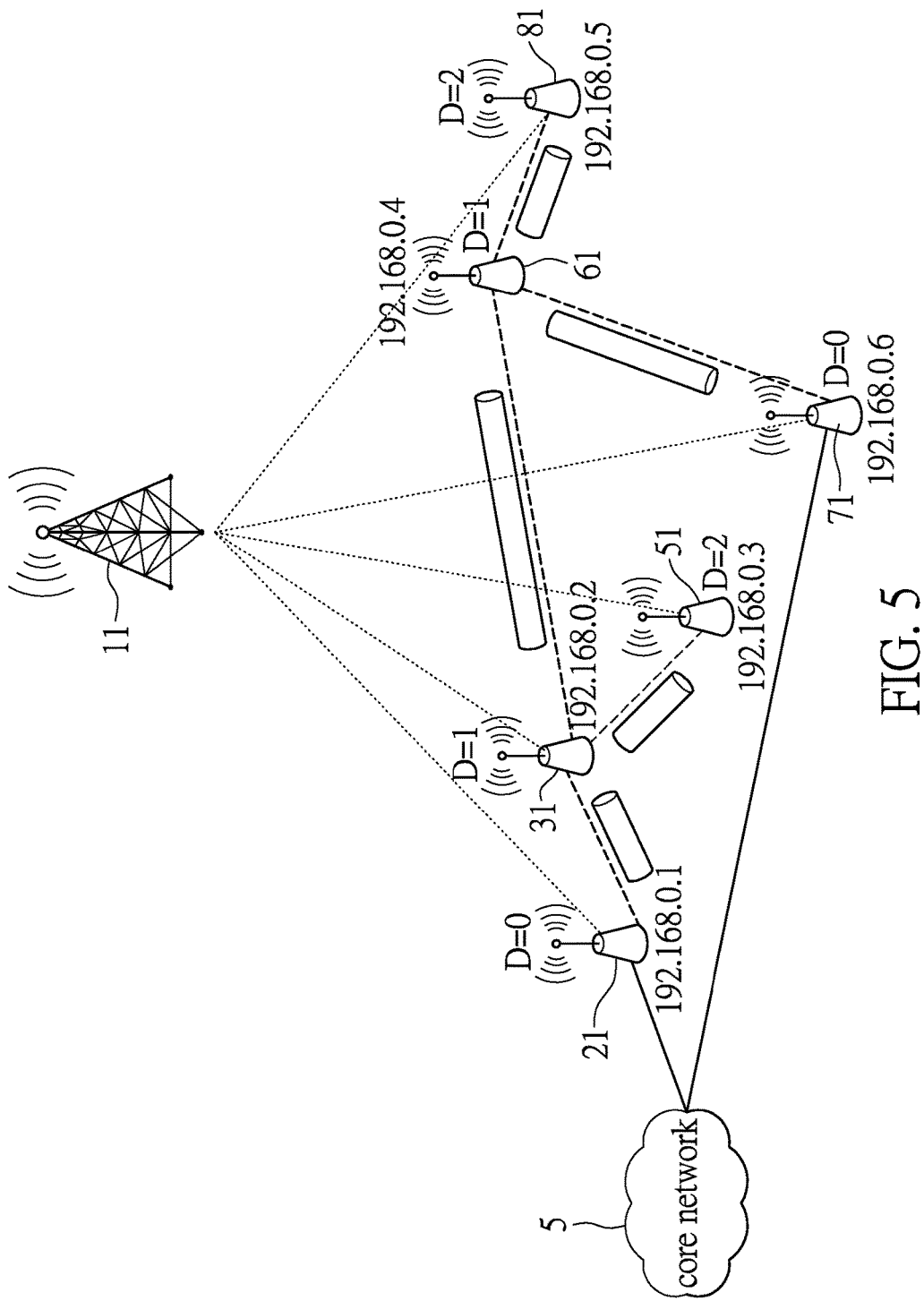
FIG. 5 shows a topology diagram of small cells of one embodiment of the instant disclosure.

Referring to FIG. 5, FIG. 5 shows a topology diagram of small cells of one embodiment of the instant disclosure. As shown in FIG. 5, the wireless backhaul management device 1 executes a wireless backhaul management program to wirelessly connect with the small cells 21, 31, 51, 61, 71 and 81. When D2D tunnels need to be established among the small cells 21, 31, 51, 61, 71 and 81, the system shown in FIG. 1 and the method shown in FIG. 2 can be used. In FIG. 5, D2D tunnels are established among the small cells 21, 31, 51, 61, 71 and 81, and each of the small cells 21, 31, 51, 61, 71 and 81 maintains a wireless backhaul topology table that records the connected small cells and the direction of packet transmission. For example, the wireless backhaul topology table of the small cell 61 is as bellow.

| Small cell 61 IP address: 192.168.0.4 Topology diagram of wireless backhaul management | | |
| --- | --- | --- |
| | Tunnel depth (D) | Direction |
| Small cell 31 IP address: 192.168.0.2 | D = 1 | Uplink (To core network) |
| Small cell 81 IP address: 192.168.0.5 | D = 2 | Downlink |
| Small cell 71 IP address: 192.168.0.6 | D = 0 | Uplink (To core network) |

Figure 6:
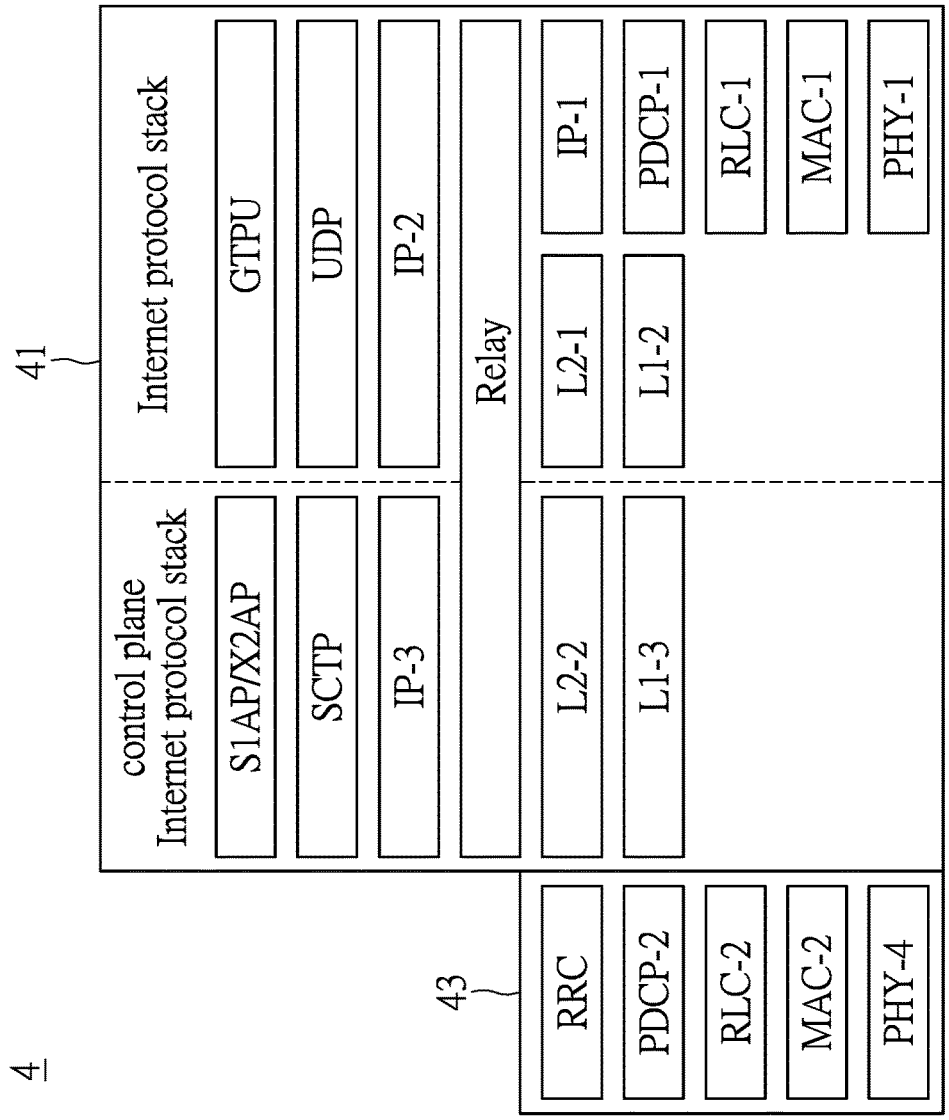
FIG. 6 is a schematic diagram showing frames of the Internet protocol of small cells in one embodiment of the instant disclosure.

When D2D tunnels are established among the small cells 21, 31, 51, 61, 71 and 81, the D2D packets can be wirelessly transmitted and received among them. The D2D packet comprises, for example, the S1/X2 control message and the user message. The S1/X2 control message is to control the packet transmission and the reception between the small cell and the core network 5. The user message is wirelessly transmitted between the small cell and the core network 5 when a user equipment transmits a packet to the core network 5. Referring to FIG. 6, FIG. 6 is a schematic diagram showing frames of the Internet protocol of small cells in one embodiment of the instant disclosure. The small cells 2, 3, 21, 31, 51, 61, 71 and 81 are configured to transmit and receive D2D packets among themselves. Each of the small cells 2, 3, 21, 31, 51, 61, 71 and 81 comprises an Internet protocol frame 4, and the Internet protocol frame 4 comprises an Internet protocol stack 41 and a wireless network protocol stack 43. The Internet protocol stack 41 comprises a control plane Internet protocol stack, a Internet protocol stack and a relay layer.

One branch of the Internet protocol stack from the bottom layer to the relay layer sequentially comprises a first physical layer (PHY-1), a first medium access control layer (MAC-1), a first radio link control layer (RLC-1), a first packet data convergence protocol layer (PDCP-1) and a first Internet protocol layer (IP-1). Another branch of the Internet protocol stack from the bottom layer to the relay layer sequentially comprises a second physical layer (Layer-1, L1-2) and a first data link layer (Layer-2, L2-1). The Internet protocol stack from the relay layer to the top layer sequentially comprises a second Internet protocol layer (IP-2), a second Internet protocol layer (UDP) and a GPRS tunneling protocol-packet data user plane layer (GTPU).

The control plane Internet protocol stack from the bottom layer to the relay layer sequentially comprises a third physical layer (L1-3) and a second data link layer (L2-2). The control plane Internet protocol stack from the relay layer to the top layer sequentially comprises a third Internet protocol layer (IP-3), a stream control transmission protocol layer (SCTP) and a S1/X2 application protocol layer (S1AP/X2AP).

In this embodiment, the Internet protocol stack from the bottom to the relay layer comprises a second physical layer and a first data link layer. The control plane Internet protocol stack from the bottom layer to the relay layer comprises a third physical layer and a second data link layer. However, it is not limited herein. In other embodiments, the second physical layer and the third physical layer can be the same physical layer, and the first data link layer and the second data link layer can be the same data link layer. In other words, the Internet protocol stack and the control plane Internet protocol stack can share the same physical layer and/or the same data link layer.

The wireless network protocol stack 43 from the bottom layer to the top layer comprises a fourth physical layer (PHY-4), a second medium access control layer (MaC-2), a second radio link control layer (RLC-2), a second packet data convergence protocol layer (PDCP-2) and a first radio resource control layer (RRC).

Figure 7:
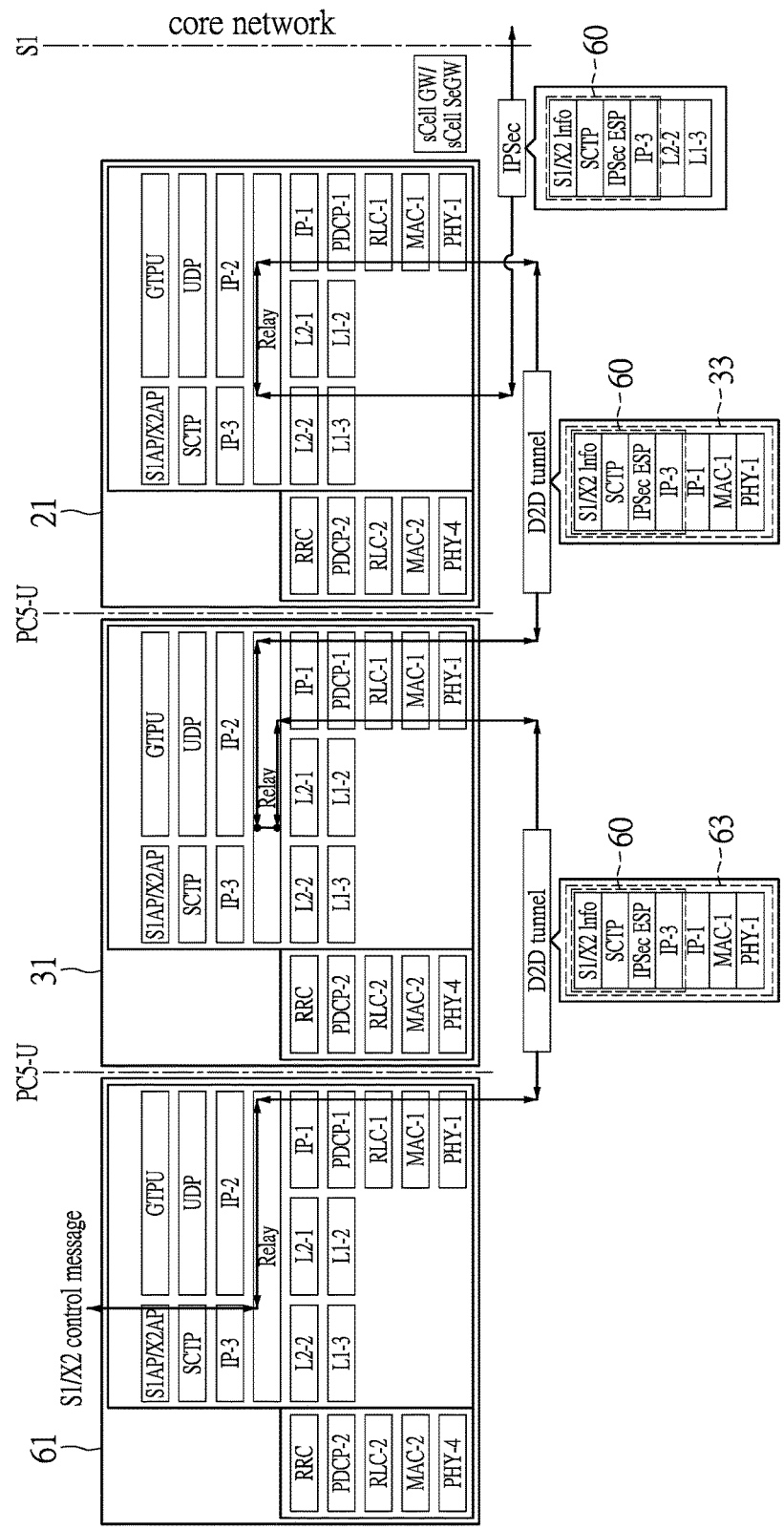
FIG. 7 is a schematic showing how to wirelessly transmit and receive a D2D packet between small cells in one embodiment of the instant disclosure.

Referring to FIG. 5 and FIG. 7, FIG. 7 is a schematic showing how to wirelessly transmit and receive a D2D packet between small cells in one embodiment of the instant disclosure. The D2D tunnels are established among the small cells 21, 31 and 61 to wirelessly transmit and receive D2D packets, wherein the D2D tunnel is a PC5 Interface (PC5-U) of a user plane. The small cell 21 is connected to the core network through an Internet protocol security (IPSec) tunnel. In other words, the small cell 21 is connected to the core network through a small cell gate way (sCell GW)/small cell security gate way (sCell SeGW). When the small cell 61 needs to transmit a S1/X2 control message to the core network, the S1/X2 control message sequentially passes through the S1/X2 application protocol layer (S1AP/X2AP), the stream control transmission protocol layer (SCTP) and the third Internet protocol layer (IP-3) to form an Internet protocol packet 60. The relay layer of the small cell 61 is configured to determine whether the Internet protocol packet 60 needs to be transmitted wiredly or wirelessly according to wired or wireless interface. In this relay layer, the Internet protocol packet 60 is determined to be packaged as a D2D packet, and this D2D packet is wirelessly transmitted to the small cell 31 through the D2D tunnel. When the small cell 61 packages the Internet protocol packet 60 as a D2D packet 63, the Internet protocol packet 60 sequentially passes through the relay layer, the first Internet protocol layer (IP-1), the first packet data convergence protocol layer (PDCP-1), the first radio link control layer (RLC-1), the first medium access control layer (MAC-1) and the first physical layer (PHY-1). After that, the small cell 61 transmits the D2D packet 63 to the small cell 31 through the D2D tunnel between the small cells 31 and

61. It notes that, through the first Internet protocol layer (IP1), the first Internet protocol address of the small cell 61, such as "192.168.0.4", is packaged into the D2D packet 63 as the source IP address, and the second Internet protocol address of the small cell 31, such as "192.168.0.2", is packaged into the D2D packet 63 as the destination IP address.

After the small cell 31 receives the D2D packet 63 transmitted by the small cell 61 through the D2D tunnel, the small cell 31 unpackages the D2D packet 63 to obtain the Internet protocol packet 60 sequentially through the first physical layer (PHY-1), the first medium access control layer (MAC-1), the first radio link control layer (RLC-1), the first packet data convergence protocol layer (PDCP-1), the first Internet protocol layer (IP-1) and the relay layer. Herein, the relay layer of the small cell 31 determines that the Internet protocol packet 60 needs to be packaged as a D2D package 33, and this D2D package 33 is wirelessly transmitted to the small cell 21 through the D2D tunnel. When the small cell 31 packages the Internet protocol packet 60 as the D2D package 33, the Internet protocol packet 60 sequentially passes through the relay layer, the first Internet protocol layer (IP-1), the first packet data convergence protocol layer (PDCP-1), the first radio link control layer (RLC-1), the first medium access control layer (MAC-1) and the first physical layer (PHY-1). After that, the small cell 31 transmits the D2D packet 33 to the small cell 21 through the D2D tunnel between the small cell 31 and the small cell 21. Through the first Internet protocol layer (IP1), the second Internet protocol address of the small cell 31, such as "192.168.0.2", is packaged into the D2D packet 33 as the source IP address, and a third Internet protocol address of the small cell 21, such as "192.168.0.1", is packaged into the D2D packet 33 as the destination IP address.

After the small cell 21 receives the D2D packet 33 transmitted by the small cell 31 through the D2D tunnel, the small cell 21 unpackages the D2D packet 33 to obtain the Internet protocol packet 60 sequentially through the first physical layer (PHY-1), the first medium access control layer (MAC-1), the first radio link control layer (RLC-1), the first packet data convergence protocol layer (PDCP-1), the first Internet protocol layer (IP-1) and the relay layer. Herein, the relay layer of the small cell 21 determines that the Internet protocol packet 60 is packaged and is wiredly transmitted to the core network because small cell 21 is connected wiredly with core network. When the small cell 21 packages the Internet protocol packet 60 and wiredly transmits that to the core network, the Internet protocol packet 60 sequentially passes through the relay layer, the second data link layer (L2-2) and the third physical layer (L1-3).

It is worth mentioning that, in the above described embodiment, the S1/X2 control message is sequentially transmitted from the small cell 61, the small cell 31, the small cell 21 and to the core network. When the S1/X2 control message is sequentially transmitted from the core network, the small cell 21, the small cell 31 to the small cell 61, the operation described in the above embodiment is implemented inversely. The only difference is that, in the D2D packet that is transmitted from the small cell 21 to the small cell 31, the first Internet protocol layer (IP-1) of the small cell 21 packages the third Internet protocol address of the small cell 21, such as "192.168.0.1", into the D2D packet as the source IP address, and packages the second Internet protocol address of the small cell 31, such as "192.168.0.2", into the D2D packet as the destination IP address. In addition, in the D2D packet that is transmitted from the small cell 31 to the small cell 61, the first Internet protocol layer (IP-1) of the small cell 31 packages the second Internet protocol address of the small cell 31, such as "192.168.0.2", into the D2D packet as the source IP address, and packages the first Internet protocol address of the small cell 61, such as "192.168.0.4", into the D2D packet as the destination IP address.

Figure 8:
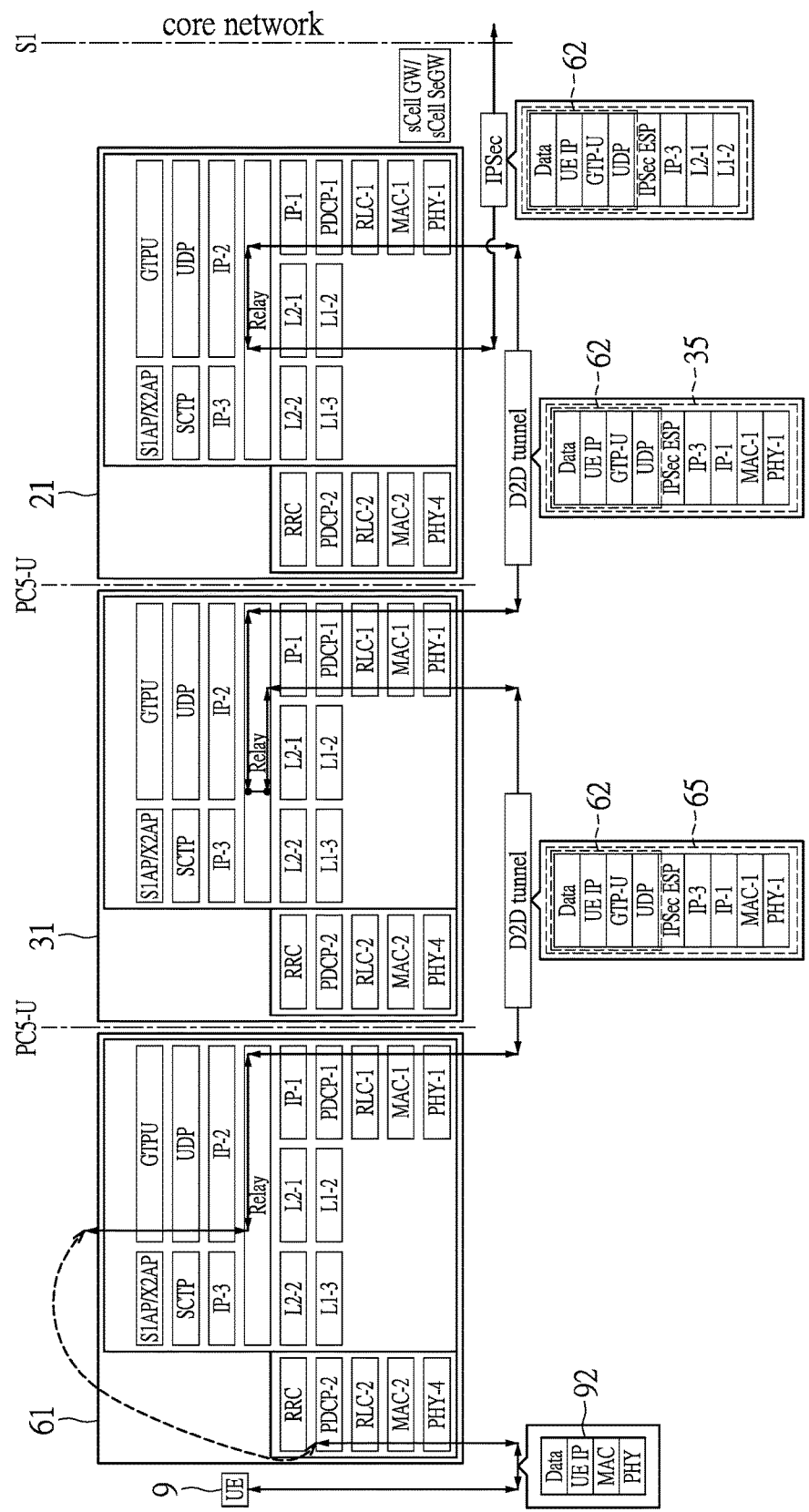
FIG. 8 is a schematic showing how to wirelessly transmit and receive a D2D packet between small cells in another embodiment of the instant disclosure.

Referring to FIG. 5 and FIG. 8, FIG. 8 is a schematic showing how to wirelessly transmit and receive a D2D packet between small cells in another embodiment of the instant disclosure. D2D tunnels are established among the small cell 21, 31 and 61 to wirelessly transmit and receive the D2D packet among the small cells. The D2D tunnel is a PC5 Interface (PC5-U) of a user plane. The small cell 21 is connected to the core network through an Internet protocol security (IPSec) tunnel. In other words, the small cell 21 is connected to the core network through a small cell gate way (sCell GW)/small cell security gate way (sCell SeGW). When a user equipment (UE) 9 transmits a user packet 92 to the small cell 61 and the small cell 61 receives the user packet 92, the small cell 61 unpackages the small cell 61 to obtain a user message sequentially through the fourth physical layer (PHY-4), the second medium access control layer (MAC-2), the second radio link control layer (RLC-2) and the second packet data convergence protocol layer (PDCP-2). When the small cell 61 receives the user message of the user equipment 92 and transmits this user message of the user equipment 92 to the core network, this user message sequentially passes the GPRS tunneling protocol-packet data user plane layer (GTPU), the user data protocol layer (UDP) and the second Internet protocol layer (IP-2) to form an Internet protocol packet 62. The relay layer of the small cell 61 is configured to determine that the Internet protocol packet 62 is to be wiredly or wirelessly transmitted. Herein, the relay layer of the small cell 61 determines to package the Internet protocol packet 62 as a D2D package 65 and to wirelessly transmit this D2D package 65 to the small cell 31. When the small cell 61 packages the Internet protocol packet 62 as the D2D package 65, the Internet protocol packet 62 sequentially passes through the relay layer, the first Internet protocol layer (IP-1), the first packet data convergence protocol layer (PDCP-1), the first radio link control layer (RLC-1), the first medium access control layer (MAC-1) and the first physical layer (PHY-1). After that, the small cell 61 transmits the D2D 65 to the small cell 31 through the D2D tunnel between the small cell 31 and the small cell 61. It is worth mentioning that, through the first Internet protocol layer (IP1), the first Internet protocol address of the small cell 61, such as "192.168.0.4", is packaged into the D2D packet 65 as the source IP address, and the second Internet protocol address of the small cell 31, such as "192.168.0.2", is packaged into the D2D packet 65 as the destination IP address.

When the small cell 31 receives the D2D packet 65 transmitted by the small cell 61 through the D2D tunnel, the small cell 31 unpackages the D2D packet 65 to obtain the Internet protocol packet 62 sequentially through the first physical layer (PHY-1), the first medium access control layer (MAC-1), the first radio link control layer (RLC-1), the first packet data convergence protocol layer (PDCP-1), the first Internet protocol layer (IP-1) and the relay layer. Herein, the relay layer of the small cell 31 determines that the Internet protocol packet 62 needs to be packaged as the D2D packet 35 and that this D2D packet 35 is transmitted to the small cell 21 through the D2D tunnel. When the small cell 31 packages the Internet protocol packet 62 as the D2D packet 35, the Internet protocol packet 62 sequentially passes through the relay layer, the first Internet protocol layer (IP-1), the first packet data convergence protocol layer (PDCP-1), the first radio link control layer (RLC-1), the first medium access control layer (MAC-1) and the first physical layer (PHY-1). After that, the small cell 31 transmits the D2D packet 35 to the small cell 21 through the D2D tunnel between the small cell 21 and the small cell 31. Through the first Internet protocol layer (IP-1), the second Internet protocol address of the small cell 31, such as "192.168.0.2", is packaged in the D2D packet 35 as the source IP address, and the third Internet protocol address of the small cell 21, such as "192.168.0.1", is packaged in the D2D packet 35 as the destination IP address.

When the small cell 21 receives the D2D packet 35 from the small cell 31 through the D2D tunnel, the small cell 21 unpackages the D2D packet 35 to obtain the Internet protocol packet 62 sequentially through the first physical layer (PHY-1), the first medium access control layer (MAC-1), the first radio link control layer (RLC-1), the first packet data convergence protocol layer (PDCP-1), the first Internet protocol layer (IP-1) and the relay layer. Herein, the relay layer of the small cell 21 determines that after the Internet protocol packet 62 is packaged, it needs to be wiredly transmitted to the core network. After the small cell 21 packages the Internet protocol packet 62, the packaged Internet protocol packet 62 is wiredly transmitted to the core network sequentially through the relay layer, the first data link layer (L2-1) and the second physical layer (L1-2).

In the above described embodiment, the user equipment 9 transmits the user package 92 to the small cell 61. After the small cell 61 unpackages the user packet to obtain a user message, the user message is transmitted sequentially from the small cell 61, to the small cell 31, the small 21, to the core network. When the user message is transmitted from the core network, to the small cell 21, the small cell 31, the small cell 61, to the user equipment 9, the operation described in the above embodiment is implemented inversely. The only difference is that, in the D2D packet that is transmitted from the small cell 21 to the small cell 31, the first Internet protocol layer (IP-1) of the small cell 21 packages the third Internet protocol address of the small cell 21, such as "192.168.0.1", into the D2D packet as the source IP address, and packages the second Internet protocol address of the small cell 31, such as "192.168.0.2", into the D2D packet as the destination IP address. In addition, in the D2D packet that is transmitted from the small cell 31 to the small cell 61, the first Internet protocol layer (IP-1) of the small cell 31 packages the second Internet protocol address of the small cell 31, such as "192.168.0.2", into the D2D packet as the source IP address, and packages the first Internet protocol address of the small cell 61, such as "192.168.0.4", into the D2D packet as the destination IP address To sum up, by using the method and the system of D2D tunnel establishment between small cells provided by the instant disclosure, D2D tunnels can be established among small cells, and a small cell can be provided to have a relay layer that can determine whether the user message and the S1/X2 control message transmitted/received through the D2D tunnel need to be wirelessly transmitted to other small cells or need to be wiredly transmitted to the core network. In addition, the D2D packets transmitted among small cells can be packaged or unpackaged, such that messages can be transmitted among small cells through D2D tunnels.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A method of device-to-device (D2D) tunnel establishment between small cells, applied to a wireless backhaul management device, a first small cell and a second small cell, wherein the wireless backhaul management device is wirelessly connected to the first small cell and the second small cell, and the first small cell is connected to a core network, the method comprising:
    matching the first small cell and the second small cell according to a first discovery response and a second discovery response;
    submitting a match report from the second small cell to the wireless backhaul management device;
    replying with a match report response from the wireless backhaul management device to the second small cell, wherein the match report response includes a wireless backhaul identification code and route information, and the route information Includes a tunnel depth;
    establishing a D2D connection authentication procedure between the second small cell and the first small cell;
    wirelessly connecting the second small cell and the first small cell, conducting a connection test and submitting a connection test report to the wireless backhaul management device;
    replying with a D2D tunnel establishment decision according to the connection test report from the wireless backhaul management device to the second small cell; and
    establishing a first tunnel between the second small cell and the first small cell.

2. The method according to claim 1, wherein before the first small cell and the second small cell matches with each other according to the first discovery response and the second discovery response, the first small cell submits a first discovery request to the wireless backhaul management device and the wireless backhaul management device replies with the first discovery response to the first small cell, and the second small cell submits a second discovery request to the wireless backhaul management device and the wireless backhaul management device replies with the second discovery response to the second small cell;
    wherein the second small cell monitors a first application code in the first discovery response broadcasted by the first small cell;
    wherein when the first application code in the first discovery response is monitored by the second small cell, the second small cell compares the first application code with a second application code in the second discovery response;
    wherein when the first application code and the second application code are the same, the first small cell successfully matches the second small cell.

3. The method according to claim 2, wherein the first discovery request comprises a first identification code of the first small cell, a first D2D identification code, a wireless backhaul identification code and a route information, and the second discovery request comprises a second identification code of the second small cell and a second D2D identification code, wherein the first D2D identification code and the second D2D identification code are the same.

4. The method according to claim 1, wherein before the first small cell and the second small cell matches with each other according to the first discovery response and the second discovery response, the first small cell submits a first discovery request to the wireless backhaul management device and the wireless backhaul management device replies with the first discovery response to the first small cell, and the second small cell submits a second discovery request to the wireless backhaul management device and the wireless backhaul management device replies with the second discovery response to the second small cell;

wherein the first small cell waits to be discovered, and the second small cell broadcasts a second application code in the second discovery response;

wherein when the second application code in the second discovery response is monitored by the first small cell, the first small cell compares a first application code in the first discovery response with the second application code;

wherein when the first application code and the second application code are the same, the first small cell replies with a response code to the second small cell, and the second small cell successfully matches the first small cell.

5. The method according to claim 4, wherein the first discovery request comprises a first identification code of the first small cell, a first D2D identification code, a wireless backhaul identification code and a route information, and the second discovery request comprises a second identification code of the second small cell and a second D2D identification code, wherein the first D2D identification code and the second D2D identification code are the same.

6. The method according to claim 1, wherein the connection test report comprises a tunnel quality, a path transmission rate, the tunnel depth and a tunnel number;

wherein the step of replying with the D2D tunnel establishment decision according to the connection test report from the wireless backhaul management device to the second small cell comprises:

determining that the tunnel quality is larger than a predetermined tunnel quality;

determining that the path transmission rate is larger than a predetermined path transmission rate;

determining that the tunnel number is smaller than a predetermined tunnel number; and determining that the first tunnel is established.

7. The method according to claim 6, wherein the step of determining that the path transmission rate is larger than the predetermined path transmission rate is to determine that the transmission rate of the wirelessly connected the second small cell and the first small cell and the transmission rate of the connected first small cell and the core network are larger than the predetermined path transmission rate.

8. The method according to claim 6, wherein after the step of determining that the tunnel number is smaller than the predetermined tunnel number, the method further comprises:

determining whether the tunnel depth is smaller than at least one of the established tunnel depths;

wherein when the tunnel depth is determined to be smaller than at least one of the established tunnel depths, the first tunnel is determined to be established to replace a tunnel having the maximum tunnel depth.

9. The method according to claim 6, wherein the second small cell and the first small cell wirelessly transmit and receive a D2D packet through the first tunnel, and each of the first small cell and the second small cell comprises:

an Internet protocol stack, comprising:

a relay layer, determining to wirelessly or wiredly transmit an Internet protocol packet; and a Internet protocol stack, comprising:

a first Internet protocol layer;

a first packet data convergence protocol layer;

a first radio link control layer;

a first physical layer; and a first physical layer wherein after the small cell packages the Internet protocol packet to obtain the D2D packet, the small cell wirelessly transmits the D2D packet sequentially through the relay layer, the first Internet protocol layer, the first packet data convergence protocol layer, the first radio link control layer, the first medium access control layer and the first physical layer;

wherein when the Internet protocol packet is transmitted through the relay layer and the first Internet protocol layer, the Internet protocol packet is packaged with a first Internet protocol address of the small cell and with a second Internet protocol address of the next small cell.

10. The method according to claim 9, wherein after the small cell wirelessly receives the D2D packet, the small cell unpackages the D2D packet to obtain the Internet protocol packet sequentially through the first physical layer, the first medium access control layer, the first radio link control layer, the first packet data convergence protocol layer, the first Internet protocol layer and the relay layer.

11. The method according to claim 9, wherein the Internet protocol stack further comprises:

a data link layer; and a second physical layer;

wherein the small cell packages the Internet protocol packet and wiredly transmits the packaged Internet protocol packet to the core network sequentially through the relay layer, the data link layer and the second physical layer.

12. The method according to claim 11, wherein the Internet protocol stack further comprises:

a second Internet protocol layer;

a user data protocol layer; and a GPRS tunneling protocol-packet data user plane layer;

wherein the small cell packages a user message to generate the Internet protocol packet sequentially through the GPRS tunneling protocol-packet data user plane layer, the user data protocol layer and the second Internet protocol layer.

13. The method according to claim 9, wherein the Internet protocol stack further comprises:

a control plane Internet protocol stack:

a second Internet protocol layer;

a stream control transmission protocol layer; and a S1/X2 application protocol layer wherein the small cell packages a S1/X2 control message to generate the Internet protocol packet sequentially through the S1/X2 application protocol layer, the stream control transmission protocol layer and the second Internet protocol layer.

14. The method according to claim 13, wherein the control plane Internet protocol stack further comprises:

a data link layer; and a second physical layer;

wherein the small cell packages the Internet protocol packet and wiredly transmits the packaged Internet protocol packet to the core network sequentially through the relay layer, the data link layer and the second physical layer.

15. The method according to claim 1, wherein the first tunnel is a PC5 Interface of a user plane.

16. A system of device-to-device (D2D) tunnel establishment between small cells, comprising a wireless backhaul management device, a first small cell and a second small cell, wherein the wireless backhaul management device is wirelessly connected to the first small cell and the second small cell, the first small cell is connected to a core network, and the system executes a method of device-to-device (D2D) tunnel establishment between small cells, wherein the system is configured to execute operations comprising:
  matching the first small cell and the second small cell according to a first discovery response and a second discovery response;
  submitting a match report from the second small cell to the wireless backhaul management device;
  replying with a match report response from the wireless backhaul management device to the second small cell, wherein the match report response includes a wireless backhaul identification code and route information, and the route information includes a tunnel depth;
  conducting a D2D connection authentication procedure between the second small cell and the first small cell;
  wirelessly connecting the second small cell and the first small cell, conducting a connection test and submitting a connection test report to the wireless backhaul management device;
  replying with a D2D tunnel establishment decision according to the connection test report from the wireless backhaul management device to the second small cell; and
  establishing a first tunnel between the second small cell and the first small cell.

17. The system according to claim 16, wherein before the first small cell and the second small cell matches with each other according to the first discovery response and the second discovery response, the first small cell submits a first discovery request to the wireless backhaul management device and the wireless backhaul management device replies with the first discovery response to the first small cell, and the second small cell submits a second discovery request to the wireless backhaul management device and the wireless backhaul management device replies with the second discovery response to the second small cell;
  wherein the second small cell monitors a first application code in the first discovery response broadcasted by the first small cell;
  wherein when the first application code in the first discovery response is monitored by the second small cell, the second small cell compares the first application code with a second application code in the second discovery response;
  wherein when the first application code and the second application code are the same, the first small cell successfully matches the second small cell.

18. The system according to claim 16, wherein before the first small cell and the second small cell matches with each other according to the first discovery response and the second discovery response, the first small cell submits a first discovery request to the wireless backhaul management device and the wireless backhaul management device replies with the first discovery response to the first small cell, and the second small cell submits a second discovery request to the wireless backhaul management device and the wireless backhaul management device replies with the second discovery response to the second small cell;
  wherein the first small cell waits to be discovered, and the second small cell broadcasts a second application code in the second discovery response;
  wherein when the second application code in the second discovery response is monitored by the first small cell, the first small cell compares a first application code in the first discovery response with the second application code;
  wherein when the first application code and the second application code are the same, the first small cell replies with a response code to the second small cell, and the second small cell successfully matches the first small cell.

19. The system according to claim 16, wherein the connection test report comprises a tunnel quality, a path transmission rate, the tunnel depth and a tunnel number;
  wherein the step of replying with the D2D tunnel establishment decision according to the connection test report from the wireless backhaul management device to the second small cell comprises:
  determining that the tunnel quality is larger than a predetermined tunnel quality;
  determining that the path transmission rate is larger than a predetermined path transmission rate;
  determining that the tunnel number is smaller than a predetermined tunnel number; and
  determining that the first tunnel is established.

20. The system according to claim 19, wherein after the step of determining that the tunnel number is smaller than the predetermined tunnel number, the method comprises:
  determining whether the tunnel depth is smaller than at least one of the established tunnel depths;
  wherein when the tunnel depth is determined to be smaller than at least one of the established tunnel depths, the first tunnel is determined to be established to replace a tunnel having the maximum tunnel depth.

21. A method of device-to-device (D2D) tunnel establishment between small cells, applied to a wireless backhaul management device, a first small cell and a second small cell, wherein the wireless backhaul management device is wirelessly connected to the first small cell and the second small cell, and the first small cell is connected to a core network, the method comprising:
  submitting, by the first small cell, a first discovery request to the wireless backhaul management device and the wireless backhaul management device replies with a first discovery response to the first small cell, and the second small cell submits a second discovery request to the wireless backhaul management device and the wireless backhaul management device replies with a second discovery response to the second small cell;
  matching the first small cell and the second small cell according to the first discovery response and the second discovery response;
  submitting a match report from the second small cell to the wireless backhaul management device;
  replying with a match report response from the wireless backhaul management device to the second small cell;
  establishing a D2D connection authentication procedure between the second small cell and the first small cell;
  wirelessly connecting the second small cell and the first small cell, conducting a connection test and submitting a connection test report to the wireless backhaul management device;
  replying with a D2D tunnel establishment decision according to the connection test report from the wireless backhaul management device to the second small cell; and
  establishing a first tunnel between the second small cell and the first small cell, wherein the second small cell monitors a first application code in the first discovery response broadcasted by the first small cell;

wherein when the first application code in the first discovery response is monitored by the second small cell, the second small cell compares the first application code with a second application code in the second discovery response;

wherein when the first application code and the second application code are the same, the first small cell successfully matches the second small cell; and wherein the first discovery request comprises a first identification code of the first small cell, a first D2D identification code, a wireless backhaul identification code and a route information, and the second discovery request comprises a second identification code of the second small cell and a second D2D identification code, wherein the first D2D identification code and the second D2D identification code are the same.

22. A method of device-to-device (D2D) tunnel establishment between small cells, applied to a wireless backhaul management device, a first small cell and a second small cell, wherein the wireless backhaul management device is wirelessly connected to the first small cell and the second small cell, and the first small cell is connected to a core network, the method comprising:

submitting, by the first small cell, a first discovery request to the wireless backhaul management device and the wireless backhaul management device replies with a first discovery response to the first small cell, and the second small cell submits a second discovery request to the wireless backhaul management device and the wireless backhaul management device replies with a second discovery response to the second small cell;

matching the first small cell and the second small cell according to the first discovery response and the second discovery response;

submitting a match report from the second small cell to the wireless backhaul management device;

replying with a match report response from the wireless backhaul management device to the second small cell;

establishing a D2D connection authentication procedure between the second small cell and the first small cell;

wirelessly connecting the second small cell and the first small cell, conducting a connection test and submitting a connection test report to the wireless backhaul management device;

replying with a D2D tunnel establishment decision according to the connection test report from the wireless backhaul management device to the second small cell; and establishing a first tunnel between the second small cell and the first small cell, wherein the first small cell waits to be discovered, and the second small cell broadcasts a second application code in the second discovery response;

wherein when the second application code in the second discovery response is monitored by the first small cell, the first small cell compares a first application code in the first discovery response with the second application code;

wherein when the first application code and the second application code are the same, the first small cell replies with a response code to the second small cell, and the second small cell successfully matches the first small cell;

wherein the first discovery request comprises a first identification code of the first small cell, a first D2D identification code, a wireless backhaul identification code and a route information, and the second discovery request comprises a second identification code of the second small cell and a second D2D identification code, wherein the first D2D identification code and the second D2D identification code are the same.

* * * * *